United States Patent [19]

Fritts

[11] 4,075,400

[45] Feb. 21, 1978

[54] OVER TEMPERATURE BATTERY DEACTIVATION SYSTEM

[76] Inventor: David H. Fritts, 112 Beverly Place, Dayton, Ohio 45419

[21] Appl. No.: 765,557

[22] Filed: Feb. 4, 1977

[51] Int. Cl.² .......................................... H01M 6/50
[52] U.S. Cl. ................................................. 429/62
[58] Field of Search ...................... 429/49, 120, 62, 61

[56] References Cited

U.S. PATENT DOCUMENTS

| | | | |
|---|---|---|---|
| 795,325 | 7/1905 | Winters | 429/61 |
| 3,877,996 | 4/1975 | Belletete | 429/120 |

Primary Examiner—Donald L. Walton
Attorney, Agent, or Firm—Joseph E. Rusz; Robert Kern Duncan

[57] ABSTRACT

A battery poisoning agent contained in thermoplastic encapsulating material, positioned adjacent a battery electrode or within the battery separators, which will melt at a predetermined temperature and release the poisoning material, deactivates that portion of a battery that is exceeding the predetermined temperature.

6 Claims, 2 Drawing Figures

OVER TEMPERATURE BATTERY DEACTIVATION SYSTEM

RIGHTS OF THE GOVERNMENT

The invention described herein may be manufactured and used by or for the Government of the United States for all governmental purposes without the payment of any royalty.

BACKGROUND OF THE INVENTION

The field of the invention is in the structure of primary and secondary batteries and more particularly in battery deactivation structure to prevent thermal runaway and explosions.

Frequently due to the breakdown or maladjustment of other equipment the electrical load placed on a battery becomes greater than the designed amount. If the overload is exceedingly large, circuit breakers or fuses in some application will operate to remove the load from the battery, however, in many applications, particularly where normally high currents are passed for only relatively short periods of time no circuit breakers or fuses are in the system. The connection of the starting motor to the battery in an automobile is a typical example of this. In some instances batteries become internally defective and produce hot spots and thermally runaway due to internal defects and shorts with normal external loading. In some installations it is of no great consequence if a battery overheats or explodes. In many applications, particularly where the battery is inaccessible, or where serious other consequences would result from an explosion such as when batteries are used in satellites, space ships and aircraft, it is extremely desirable to prevent a battery explosion. Also, it is frequently very desirable to maintain some source of energy, even though reduced, after a battery has been damaged by an overload or an internal defect.

Prior art means of internally controlling the temperature of batteries is exemplified by U.S. Pat. No. 3,837,918 to patentee Nakabagashi, and 3,880,670 to patentee Shinn.

SUMMARY OF THE INVENTION

The invention provides structure for improving a battery that will internally protect it from overheating, thermal runaway, and mechanical rupture caused by hot spot formation and overloading.

DESCRIPTION OF THE PREFERRED EMBODIMENTS

A battery generates its energy by the chemical action of an electrolyte between electrodes of opposite polarity. Generally, the electrolyte is contained in a separator between the electrodes. The chemical action taking place during discharge (or charge) generates heat that must be dissipated by the battery structure. Too great or too fast a release of thermal energy within the battery frequently warps the mechanical structure causing shorting of the electrodes and frequently an explosion of the battery. This release of thermal energy within a battery may be throughout the entire battery structure due to an abnormal amount of current (an overload) being drawn by an exterior malfunctioning load; or the release of thermal energy within the battery may be localized in a "hot spot" on or between the electrodes due to slight uncontrollable imperfection in the manufacture of the battery.

A substance that will stop the chemical reaction, i.e., a poison to the battery action, will deactivate the battery wherever the substance is released to interfere with electrolyte. This may be locally or throughout the battery. By making the release of the poisoning agent responsive to temperature and strategically distributing it within the battery, hot spots, or the complete battery, may be deactivated before thermal runaway with a probable battery explosion occurs.

Figure 1:
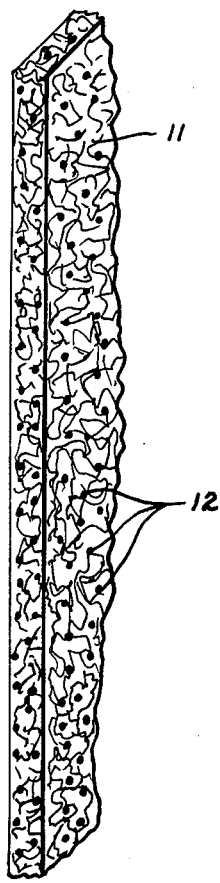
FIG. 1 is a schematic pictorial representation of a mat containing globules of encapsulated poison.

Generally, the preferred deactivation structure is a mat of material, similar to a conventional battery separator, that has a poisoning agent, encapsulated in a thermoplastic material, dispersed on and/or through it. Such an assembly is illustrated in FIG. 1. This assembly is inserted in the battery during its fabrication. The woven mat contains a plurality of small spheres or globules 12 of an encapsulated poison. The globules encapsulating the poison may be held in place in a thin loosely woven mat by a suitable adhesive, or by mechanical friction, e.g., entanglement within a more closely woven mat of separator like material. Generally, the later means of retaining the encapsulated poison globules is preferred due to variations in the thermal release of the poisoning agent brought about by variations in the adhesive. However, the thicker the mat containing the globules the higher the normal internal resistance of the battery becomes, and the lower the power capabilities of the battery for a given size. The amount of resistance increase depends also on the type of battery to which the invention is applied. An internal resistance increase of approximately 10% is a typical value that will generally provide sufficient deactivation to assure safety from thermal runaway and explosion. A convenient estimation of the increase in the normal internal resistance may be obtained by considering the proportion of the additional thickness added by the deactivation assembly to the overall effective separator package thickness.

Those practicing this invention will readily adapt the materials used in fabricating the invention to the particular battery structure in which the invention is utilized. Two specific embodiments will be described in detail later. Generally, suitable encapsulating materials are thermoplastic plastic compounds such as the polyethylenes, and polyvinyl chlorides. Both materials are conventionally fabricated to have various determined specific melting temperatures. Wide ranges of diameters and wall thicknesses are readily available. Diameters from 20 to 500 microns with wall thicknesses from 2 to 25 microns are ranges generally suitable for this invention.

The poisoning agents contained in the thermoplastic globules may deactivate either by serving as merely blocking agents to the flow of current between the electrodes, i.e., as by inserting an insulator, without chemically reacting with the conventional chemicals in the battery, or the released poison may deactivate the battery action by chemically combining with one or more of the elements in the battery altering their properties. For example, the poison may react with one or both electrodes forming passivating layers, or it may react with the electrolyte greatly increasing its resistance in the effected area. In addition, poisoning agents having combined properties may be used. Typical examples of the blocking type poisoning agents are the various waxes. Melting temperatures ranging from 30°–40° C to over 200° C may be chosen. Some waxes are inert enough that encapsulation is unnecessary. Typical examples of a combination type poisoning agent are nonflammable mineral oils with a passivating compound in solution such as hexachloroethane.

Materials that are suitable from which to fabricate the mat holding the encapsulated poison include nylon, cellophane, polyethylene, and Fiberglas. In general, materials that are suitable for the separator in a particular battery are also suitable for the mat containing or holding the deactivation material. Specific applications of the invention to two common batteries follow.

Lithium Thionyl Chloride Battery

Figure 2:
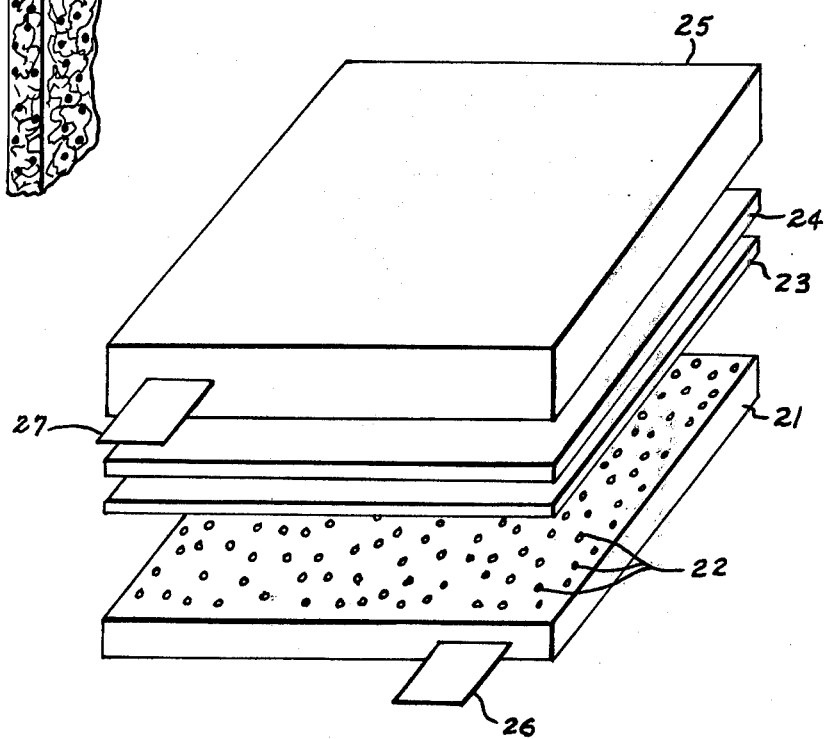
FIG. 2 is a schematic pictorial representation of an embodiment of the invention in a battery.

Referring to FIG. 2, the conventional lithium anode 21 is placed on an approximately horizontal surface and globules of encapsulated poison are distributed over the surface of the lithium electrode. A convenient and suitable way of distributing the capsules uniformly over the electrode is by sifting them through a mesh screen having openings slightly larger than the capsules. The capsules are covered with a relatively finely woven fiberglas mat 23. Typical mat thicknesses are 25 to 50 microns. The mat holds the capsules in place irrespective of later motions or positions of the battery. This assembly of lithium anode and mat containing the poisoning agent is then assembled with the remaining conventional battery elements, e.g., the separator 24 and the carbon cathode 25 in the same conventional manner as the lithium anode in the prior art batteries. The elements of the battery including the new deactivating element are conventionally encased in a case with exterior electrical connectors connected to connecting tabs 26 and 27.

Suitable poisoning agents for this battery are antimony trichloride, carbon tetrachloride, disulfur dichloride, hexachloroethane, and conventional transformer mineral oils. Paraffin wax may also be used. Generally, conventional transformer mineral oil is preferred.

Suitable encapsulating agents are polyethylenes, and polyvinylchlorides. The generally accepted maximum safe temperature for this particular battery is approximately 170° F, thus, the encapsulating agent must become liquid and release the poisoning agent at approximately this temperature. The fabrication of polyethylenes to melt at this temperature is well known and conventionally accomplished. Generally, polyethylenes are the preferred encapsulating agent.

The encapsulating of materials is a well known art. Sizes of the capsule globule is readily controlled over a wide range from a few microns in diameter to larger than a centimeter. Typical suitable sizes of the approximately spherical capsule globules for this particular embodiment are approximtely 50 to 100 microns diameter, with wall thicknesses of approximately 5 to 10 microns. A density of approximately 200 to 1000 capsules per square centimeter of electrode surface area is a typical suitable value of capsule density for this battery.

Nickel-Cadmium Battery

The preferred encapsulating material is polyethylene conventionally formulated to melt at approximately 200° F. The encapsulate retaining mat is woven nylon of approximately two mils thickness. FIG. 2 as an illustrative schematic drawing is also applicable to this embodiment when electrode 21 is considered to be Nickel, electrode 25 is Cadmium, the woven nylon mat is 23, the encapsulate 22, and 24 is the conventional separator. The encapsulated poison 22 is held in place by entanglement in the woven nylon mat 23. An alternative means of holding the capsules in place on the electrode is to coat them with an adhesive, such as latex or commercial products such as Fuller Resweld and Coast ProSeal, before depositing them on the electrode. When the capsules are retained by an adhesive the mat 23 is not used. Suitable poisoning agents for encapsulating in the globules are low melting point waxes, e.g., beeswax and paraffin. (Note that the melting point of the poisoning agents must be equal to or lower than the melting point of the encapsulate.) Mineral oils that are substantially insoluble in the electrolyte are also suitable poisoning agents.

It is to be observed that this invention is applicable to both primary and secondary cells and that it will provide thermal protection both during discharge and charge operation.

I claim:

1. The improvement in battery structure to deactivate the battery in locations within the battery where overheating and temperatures exceeding a predetermined safe value occur, the said battery having an electrode and a separator containing an electrolyte, the said improvement comprising:
    a. a battery poisoning agent;
    b. an encapsulant having a determined melting temperature approximately equal to the said safe value, encapsulating the said battery poisoning agent; and
    c. means for positioning the said encapsulant encapsulating the said positioning agent between the said electrode and the said separator.

2. The improvement in battery structure for deactivating the battery in locations within the battery where overheating and temperature exceeding a predetermined safe value occur, the said battery having an electrode, and separator material containing an electrolyte, the said improvement comprising:
    a. a battery poisoning agent;
    b. an encapsulant having a determined melting temperature approximately equal to the said safe value, encapsulating the said battery poisoning agent; and
    c. means, including a mat fabricated from the same material as the said separator material, for positioning the said encapsulant. substantially uniformly throughout the cross section area between the said electrode and the said separator material containing an electrolyte.

3. The improvement in battery structure for deactivating the battery in locations within the battery where overheating and temperature exceeding a predetermined safe value occur, the said battery having an anode, a cathode, and a separator containing an electrolyte, the said improvement comprising:
    a. a battery poisoning agent;
    b. an encapsulant having a determined melting temperature approximately equal to the said safe value, encapsulating the said poisoning agent; and
    c. means for positioning and holding the said encapsulant substantially uniformly over the said anode.

4. The improvement as claimed in claim 3 wherein the said encapsulant comprises globules.

5. The improvement as claimed in claim 4 wherein the said means for holding the said globules includes an adhesive.

6. The improvement as claimed in claim 4 wherein the said means for holding the said globules is a woven mat.

* * * * *